(12) United States Patent
Dong

(10) Patent No.: US 8,724,560 B2
(45) Date of Patent: May 13, 2014

(54) METHOD FOR ALLOWING A UICC TO MANAGE THE PDP CONTEXT PARAMETHERS

(75) Inventor: Olivier Dong, Draveil (FR)

(73) Assignee: NEC Corporation, Tokyo (JP)

( * ) Notice: Subject to any disclaimer, the term of this patent is extended or adjusted under 35 U.S.C. 154(b) by 334 days.

(21) Appl. No.: 12/733,255

(22) PCT Filed: Aug. 14, 2008

(86) PCT No.: PCT/JP2008/065054
§ 371 (c)(1),
(2), (4) Date: Apr. 6, 2010

(87) PCT Pub. No.: WO2009/025375
PCT Pub. Date: Feb. 26, 2009

(65) Prior Publication Data
US 2010/0232386 A1    Sep. 16, 2010

(30) Foreign Application Priority Data
Aug. 21, 2007  (EP) ..................................... 07114694

(51) Int. Cl.
*H04W 88/00* (2009.01)
(52) U.S. Cl.
USPC ........................................................ 370/329
(58) Field of Classification Search
USPC .......... 370/329, 230, 419, 420, 421; 455/558, 455/557
See application file for complete search history.

(56) References Cited

U.S. PATENT DOCUMENTS

| 7,353,017 | B2 * | 4/2008 | Chen et al. | 455/414.2 |
| 2004/0037269 | A1 * | 2/2004 | Lundin | 370/352 |

(Continued)

FOREIGN PATENT DOCUMENTS

| CN | 1647490 A | 7/2005 |
| CN | 1768538 A | 5/2006 |

(Continued)

OTHER PUBLICATIONS

Smart Cards; Card Application Toolkit (CAT) (ETSI TS 102 223 v7.7.0, Jul. 2007).*

(Continued)

*Primary Examiner* — Thai Nguyen
(74) *Attorney, Agent, or Firm* — McGinn IP Law Group, PLLC

(57) ABSTRACT

The invention relates to a method for setting up data bearer parameters for a wireless communication between a User Equipment (2) and a remote server (12, 14, 15) in a telecommunication network, said UE (2) comprising a UICC (4) and a Mobile Equipment (6) having each a TCP/IP stack, said UICC (4) embodying at least one application intended to connect to at least one application on the network side, said method comprising the following steps:

the UICC sends to the Mobile Equipment ME PDP context parameters within a specific command defined for activating or deactivating a PDP context, on reception of said specific command, the Mobile Equipment transmits a PDP context request to the Network with the parameters received in said specific command, on reception of said PDP context request the Network transmits to the Mobile Equipment (6) a confirmation for a PDP context activation or for a PDP context deactivation, the Mobile Equipment (6) forwards said confirmation to the UICC (4).

12 Claims, 2 Drawing Sheets

(56) References Cited

U.S. PATENT DOCUMENTS

| | | | |
|---|---|---|---|
| 2005/0083899 A1* | 4/2005 | Babbar et al. | 370/342 |
| 2005/0235149 A1* | 10/2005 | Beckmann et al. | 713/168 |
| 2005/0259673 A1* | 11/2005 | Lu et al. | 370/419 |
| 2006/0079284 A1 | 4/2006 | Lu et al. | |

FOREIGN PATENT DOCUMENTS

| | | |
|---|---|---|
| WO | WO 0209451 A2 * | 1/2002 |
| WO | WO 03/005669 A1 | 1/2003 |
| WO | WO2006/032993 | 3/2006 |

OTHER PUBLICATIONS

3rd Generation Partnership Project, "Technical Specification Group GERAN; Enhanced Generic Access Networks Study (EGAN)" (Release 8), 3GPP TR 43.902 V1.1.0 (Feb. 2007).

ETSI, "Smart cards; New UICC-Terminal Interface; Internet Protocol Connectivity Between UICC and Terminal" (Release 7), ETSI TS 102 YY V0.3.0 (May 2006).

ETSI, Smart Cards; Card Application Toolkit (CAT)(Release 7), ETSI TS 102 223 V7.5.0 (Oct. 2006).

English translation of Chinese Office Action dated Aug. 3, 2012.

Office Action dated Nov. 6, 2013 in U.S. Appl. No. 13/770,698.

\* cited by examiner

METHOD FOR ALLOWING A UICC TO MANAGE THE PDP CONTEXT PARAMETHERS

TECHNICAL DOMAIN

The present invention pertains to wireless telecommunication field and concerns a method for setting up data bearer parameters for a TCP/IP connection between a User Equipment (UE) and a remote server among a plurality of remote servers located in an telecommunication operator network, said UE comprising a UICC and a Mobile Equipment (ME) having each a TCP/IP stack.

More specifically, the invention aims at allowing the UICC (Universal Integrated Circuit Card) to set up data bearer parameters.

STATE OF PRIOR ART

It is expected that in ETSI SCP Rel-7, the UICC will include its own TCP/IP stack that Would provide an internet connectivity solution.

Up to now, the internet connectivity was provided by the BIP (Beater Independent Protocol) which allows the UICC to create several data connections to different remote servers (gateways/APN) with different connection parameters (e.g. different bearer types, QoS, . . . ). Such flexibility is very useful for the Operators since they can easily setup services/gateways with different corresponding tariffs.

In the current TCP/IP internet connectivity specifications (ETSI TS 102 483), there is no mechanism for the UICC to provide the Mobile Equipment (ME) with the parameters (PDP context parameters) of data connections that will be used by Application located on the UICC to communicate with a remote server. The UICC can only indicate the remote server IP address to the Mobile Equipment. Consequently, the Mobile Equipment will use some default parameters to establish the data connection.

Since the data connection over TCP/IP should replace the BIP from rel-7 applications onwards, it is therefore desirable that this new feature should have at least the same capability/flexibility as provided by the BIP.

Moreover, a PDP context could be already activated prior to the request from the UICC (activated for a Mobile Equipment (ME) Application for example). That means a PDP context could be already activated prior to any request from the UICC (asking for a PDP context activation for a UICC application). Two situations may occur:

In case the Mobile Equipment (ME) do not support the Multiple PDP context feature, any further PDP activation request (e.g. from the UICC) will be rejected as the only supported PDP context is already activated.

In case the Mobile Equipment (ME) supports the Multiple PDP context feature, the activation of a new PDP context may not be needed if the current PDP context parameters already fit the UICC needs.

Therefore, a new notification mechanism would be very useful to enhance the behaviour and avoid any redundant/useless operations.

A first object of the invention is to allow a UICC associated with a Mobile Equipment in a wireless User Equipment (UE) to provide said Mobile Equipment (ME) with the bearer parameters for data connections (PDP context parameters) using the TCP/IP protocol for example in GPRS/3G packet service or HSDPA/UTRAN packet service with extended parameters.

A second object of the invention is to allow the ME to notify the UICC about any status change of any PDP context (activation or deactivation) and its associated parameters.

In order to anticipate the future evolution of the UICC, i.e. since the flash memory technology will allow the storage capacity in the UICC to reach few Gigabytes, it is expected that a growing number of applications will be implemented in the UICC, and especially applications which need a connection with a remote network data server.

Such situation could lead the UICC to request the Mobile equipment to quite often activate/deactivate PDP contexts for all these applications.

Therefore, another third object of the present inventions is a method to better handle this situation by avoiding too much redundant operations.

PRESENTATION OF THE INVENTION

The first object of the invention is achieved by means of a method comprising the following steps:

the UICC sends to the Mobile Equipment (ME) the PDP context parameters within a specific command defined for activating or deactivating a PDP context, On reception of said specific command, the Mobile Equipment transmits a PDP context activation or deactivation request to, the Network with the parameters received in said specific command, on reception of said request, the Network transmits to the Mobile Equipment a confirmation for a PDP context activation or for a PDP context deactivation, The Mobile Equipment forwards said confirmation to the UICC.

To achieve the second object, the method according to the invention further comprises the following steps, the Mobile Equipment informs the UICC about any status change of a PDP context activation or deactivation, and sends the related PDP context parameters to the UICC, The UICC registers to a PDP context related event, and when a PDP context status change occurs, the Mobile Equipment sends a notification to the UICC with the new status and the related data.

To achieve the third object, the method according to the invention further comprises the following steps:

defining a preferred APN (Access Point Name) usable by as many UICC applications as possible, Indicating in said specific command that the PDP context for the indicated APN should be kept activated as much as possible (i.e. if for any reason, this PDP context is deactivated, the ME shall re-activate it as soon as possible).

According to another feature of the invention, the PDP context parameters could be dynamically updatable from the Network side using the Over The Air mechanism.

In a preferred embodiment of the invention, in case a PDP context is already activated for a Mobile Equipment Application prior to the request from the UICC, and in case the current parameters of the already activated PDP context fit the UICC needs, the Mobile Equipment notifies the UICC about the parameters of the already activated PDP context in order to avoid redundant operations of the UICC.

BRIEF DESCRIPTION OF THE FIGURES

The forgoing summary, as well as the following detailed description, will be better understood when read in conjunction with the appended figures in which.

DETAILED PRESENTATION OF PARTICULAR EMBODIMENTS

Figure 1:
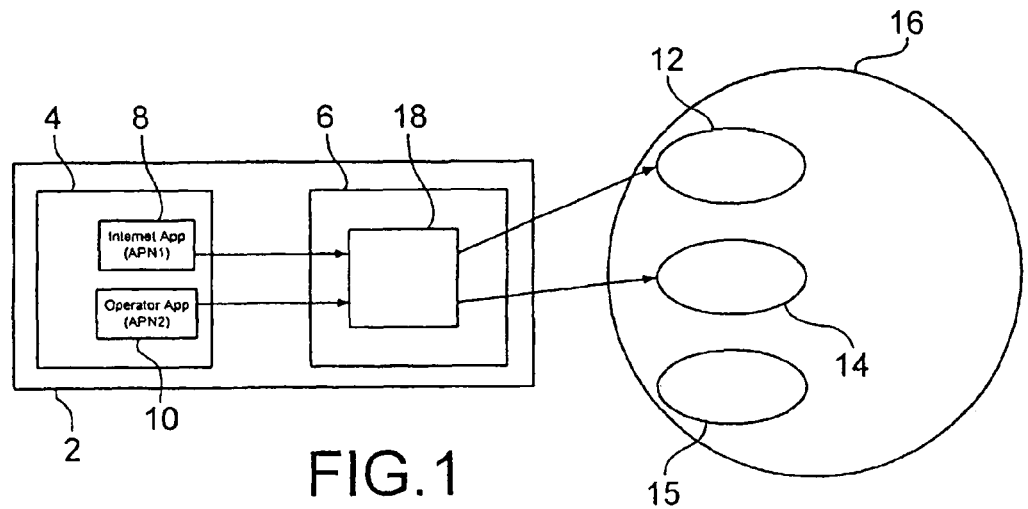
FIG. 1 represents a system in which the method according to the invention is implemented.

FIG. 1 schematically represents a User Equipment (UE) 2 comprising a UICC 4 and a Mobile Equipment (ME) 6. Each one of the UICC 4 and the ME 6 includes a TCP/IP stack. The UICC 4 further comprises at least a first application 8 (an Internet Application or an operator Application 10 or any other) that exchanges data with a remote server (respectively with a first remote server 12 and a second remote server 14 located in the operator Network 16 in this example). The ME 6 further comprises a Routing/Network Address Tanslation Module 18.

Before rel-7, the Internet Application 8 or the operator Application 10 used the BIP (Bearer Independent Protocol) connectivity solution on the ME-UICC interface to connect to a remote client/server.

The BIP protocol allows the UICC 4 to create several data connections to different remote servers with different connection parameters (e.g. different bearer types, QoS, . . . ) by associating an Access Point Name (APN) representing a remote server of the Operator Network 16 to each application of the UICC 4.

Since the data connection over TCP/IP should progressively replace the BIP from rel-7 onwards, it is then desirable that the main bearer parameters of a data connection (mainly QoS and the PDP type parameter (i.e. IP) may be provided by the UICC 4 to the ME 6 via a protocol other than the BIP.

According to one embodiment of the invention, a specific command e.g. SET PDP CONTEXT Request is defined for activating or deactivating a PDP context. The structure of said SET PDP CONTEXT request is given in the following table:

| Description | Clause | M/O/C | Min |
| --- | --- | --- | --- |
| command Tag | New tag value to be defined (e.g. 0x10) | M | Y |
| Length (Z) | — | M | Y |
| PDP context parameters | See definition below | M | Y |

The corresponding new TLV data object: PDP context parameters is given in the following table:

| Byte(s) | Description | Length |
| --- | --- | --- |
| 1 | PDP context parameters tag (e.g. 0x53) | 1 byte |
| 2 | Length (Y) | 1 byte |
| 3 | PDP context status | 1 byte |
| 4 | Bearer type | 1 byte |
| 5 to X + 4 | Bearer parameters | X bytes |
| X + 5 | Type of IP address | 1 |
| (X + 6) to (X + 9) or (X + 6) to (X + 21) | IP address | 4 or 16 bytes |

PDP Context Status
'00'=deactivation/deactivated
'01'=activation/activated
'11'=activation/activated as "always on" or "permanent"
Other values are RFU (Reserved for Future Use)
Bearer Type
'01'=GPRS/3G packet service.
'02'=UTRAN packet service with extended parameters/HSDPA.
Other values are RFU.
Bearer Parameters (Example for GPRS/3G Packet Service X=6 bytes
Byte 2: Precedence class
Byte 3: Delay class
Byte 4: Reliability class
Byte 5: Peak throughput class
Byte 6: Mean throughput class
Byte 7: Packet data protocol type: '02'=IP (Internet Protocol)
    Type of IP Address:
    '21'=IPv4 address
    '57'=IPv6 address
    IP Address If Type of IP address indicates IPv4, bit 8 of byte (X+6) represents the most significant bit of the IP address and bit 1 of byte (X+9) the least significant bit.

If Type of IP address indicates IPv6, bit 8 of octet (X+6) represents the most significant bit of the IP address and bit 1 of byte (X+21) the least significant bit.

Moreover, a New command "SET PDP CONTEXT Response" is defined as follows:

| Description | Clause | M/O/C | Min |
| --- | --- | --- | --- |
| command Tag | New tag value to be defined (e.g. 0x11) | M | Y |
| Length | 2 bytes | M | Y |
| Result | See definition below | M | Y |

Result (2 bytes):
Coding of $1^{st}$ byte:
  '00'=Command performed successfully;
  '01'=Command performed with partial comprehension;
  '02'=Command performed, with missing information;
  '20'=Mobile equipment 6 currently unable to process command;
  '21'=Network currently unable to process command;
  '22'=User did not accept the command;
  '30'=Command beyond Mobile equipment 6's capabilities;
  '31'=Command type not understood by Mobile equipment 6;
  '32'=Command data not understood by Mobile equipment 6;
Coding of $2^{nd}$ byte:
  In case the $1^{st}$ byte is '3X', the Mobile equipment 6 may indicate the failure cause in the $2^{nd}$ byte.

Furthermore, a new EVENT REGISTRATION command is defined as follows:

| Description | Clause | M/O/C | Min |
| --- | --- | --- | --- |
| command Tag | New tag value to be defined (e.g. 0x20) | M | Y |
| Length | — | M | Y |
| Event list | See definition below | M | Y |

According to the invention the Event List is defined as follows:

| Byte(s) | Description | Length |
| --- | --- | --- |
| 1 | Event list tag | 1 |
| 2 to Y + 1 | Length (X) of bytes following | Y |
| Y + 2 to X + Y + 1 | Events | X |

Events:
content: A list of events, of variable length. Each byte in the list defines an event. Each event type shall not appear more than once within the list;
coding: Each byte in the event list shall be coded with one of the values below:
'00'=MT call;
'01'=Call connected;
. . .
'10'=Frames Information Change;
'30'=PDP context status The UICC 4 shall register to this PDP context status event using the EVENT REGISTRATION command in order to be notified by the Mobile equipment 6 about any PDP context status change.

The Mobile equipment 6 shall send an EVENT NOTIFICATION command (new command defined below) to the UICC (in case the UICC has previously registered to the event described just above) including the "PDP context parameters" data object defined above.

In addition, a new EVENT NOTIFICATION command is defined as follows:

| Description | Clause | M/O/C | Min |
| --- | --- | --- | --- |
| command Tag | New tag value to be defined (e.g. 0x21) | M | Y |
| Length | — | M | Y |
| Event list | See definition above | M | Y |
| PDP context parameters | See definition in the command description section above | M | Y |

Event list: the event list object shall contain the PDP context status event
PDP context parameters shall contain the PDP context data as described in part A.

Implementation of the "Always on" or "Permanent" PDP Context for UICC Applications:

In order to activate a PDP context as an "Always On" or "permanent" PDP context (i.e. a PDP context that the ME shall keep activated as much as possible), the UICC shall set the "PDP context status" parameter in the "PDP context parameters" data object to '11' as described in the part A of this paragraph.

The Mobile equipment 6 shall activate this PDP context in case it supports the multiple PDP contexts or in case there is no existing PDP context yet.

Figure 2:
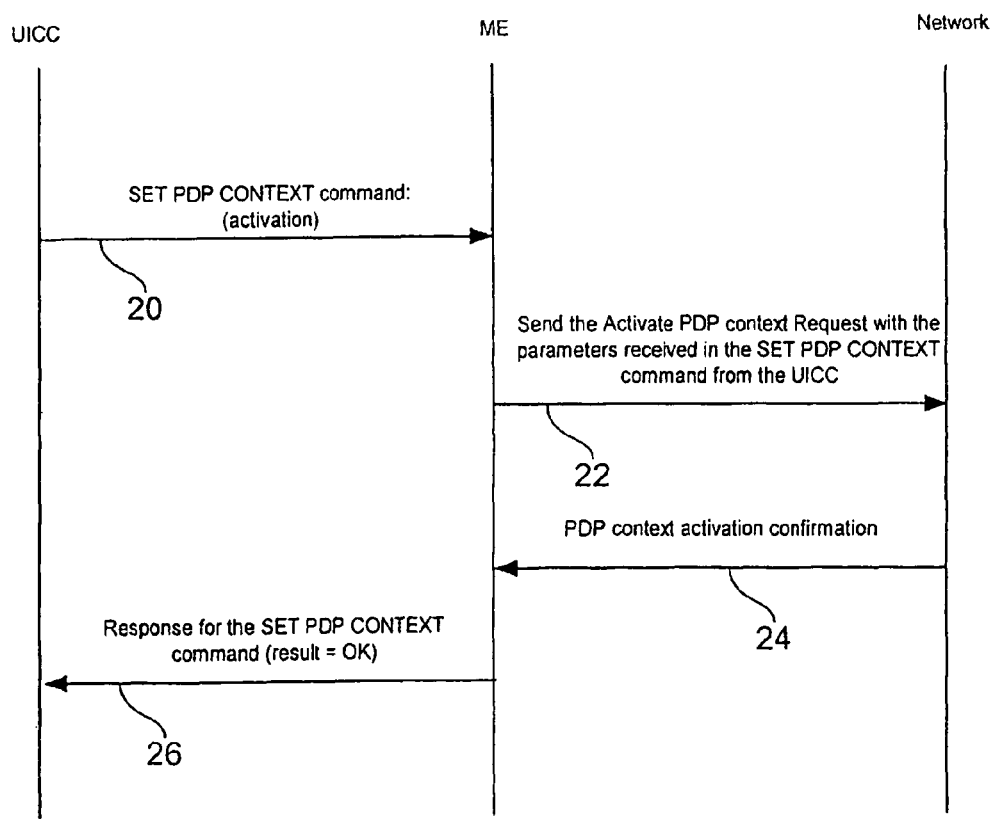
FIG. 2 is a flow chart illustrating the mains steps of the method according to the invention.

FIG. 2 illustrates the main steps of the method according to this embodiment of the invention.

The UICC 4 transmits to the ME 6 the dedicated command "SET PDP CONTEXT" (arrow 20).

On reception of said specific command, the Mobile Equipment 6 transmits (arrow 22) a PDP context request to the Network with the parameters received in said specific command, On reception of said PDP context request the Network transmits to the Mobile Equipment 6 (arrow 24) a confirmation for a PDP context activation.

The Mobile Equipment 6 forwards (arrow 26) said confirmation to the UICC 4.

Figure 3:
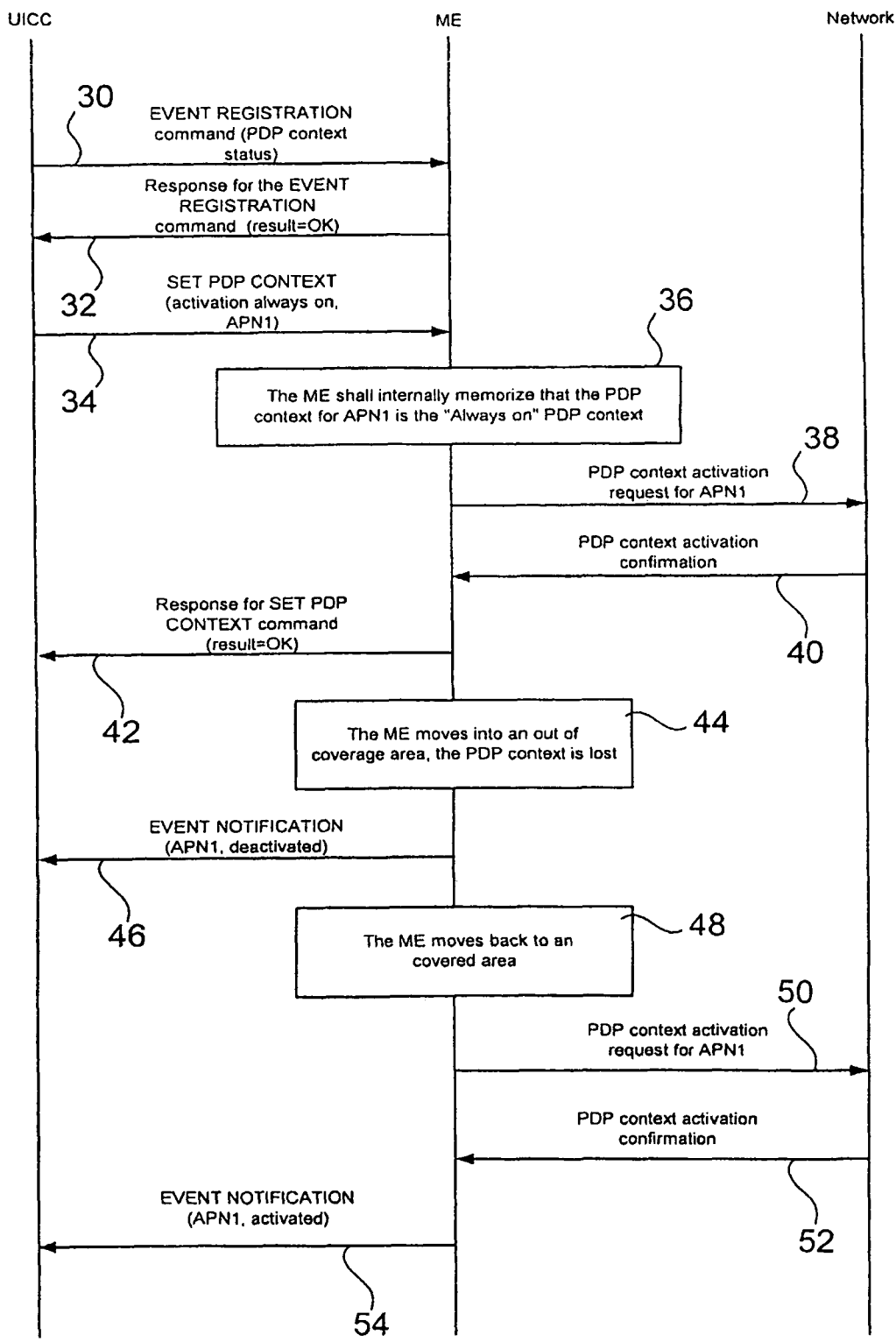
FIG. 3 is a flow chart illustrating a particular embodiment of the invention.

FIG. 3 illustrates the main steps of the implementation of invention with an "Always on" PDP context for UICC applications.

In order to be notified by the ME 6 about any PDP context status change, the UICC register to the new event EVENT REGISTRATION (arrow 30).

The Mobile equipment 6 transmits a response for the EVENT REGISTRATION (arrow 32) to the UICC 4.

On reception of said response (or later on), the UICC 4 set the. "PDP context status" parameter in the "PDP context parameters" for APN1 data object to '11' as described above (arrow 34).

At step 36, the ME 6 memorizes the PDP context for APN1 as an "always on" PDP context, and sends a PDP context activation request for APN1 to the Network (arrow 38).

The Network sends back to the ME 6 a confirmation for the PDP context activation (arrow 40).

The ME 6 forwards to the UICC 4 the confirmation for the SET PDP CONTEXT command (arrow 42).

If the ME 6 moves to an out of coverage area where the PDP context is lost (step 44), it sends an EVENT NOTIFIACTION (APN1, deactivated) to the UICC 4 (arrow 46).

And If the ME 6 moves back to a covered area (step 48), it sends to the Network a PDP context activation request for APN1.

The Network sends back to the ME 6 a confirmation for a PDP context activation for APN1 (arrow 52).

The ME 6 notify the UICC 4 of the said confirmation (arrow 54).

The methods according to the invention may be implemented in UICCs and Mobile equipments in any 3GPP wireless telecommunication system from Rel-7 onwards.

The invention claimed is:
1. A method for allowing a Universal Integrated Circuit Card (UICC) to set up data bearer parameters for a wireless communication between a User Equipment (UE) and a remote server in a telecommunication network, said UE comprising said UICC and a Mobile Equipment each comprising a TCP/IP stack, said UICC embodying at least a first application that connects to at least a second application on a network side, said method comprising:
   the UICC sending to the Mobile Equipment Packet Data Protocol (PDP) context parameters within a specific command defined for activating or deactivating a PDP context, wherein said specific command indicates that the PDP context for a preferred APN (Access Point Name) should be activated;
   on a reception of said specific command, the Mobile Equipment transmitting a PDP context activation or deactivation request to the Network with the parameters received in said specific command;
   on a reception of said PDP context request, the Network transmitting to the Mobile Equipment a confirmation for a PDP context activation or for a PDP context deactivation; and
   the Mobile Equipment, upon a receipt of the confirmation, sending a response message to the UICC for confirming a successful command performance
   wherein, in a case a PDP context is already activated for a Mobile Equipment Application prior to said specific command from said UICC, and in a case current parameters of the already activated PDP context fit UICC needs, said Mobile Equipment notifies said UICC about parameters of the already activated PDP context.

2. The method according to claim 1, wherein the Mobile Equipment informs the UICC about any status change of a PDP context activation or deactivation, and sends related PDP context parameters to the UICC,
wherein the UICC registers to a PDP context related event, and
wherein, when a PDP context status change occurs, the Mobile Equipment sends a notification to the UICC with the changed status and related data.

3. The method according to claim 1, wherein said PDP context parameters are dynamically updatable from the Network side using an Over The Air mechanism.

4. The method according to claim 1, wherein the preferred APN is usable by as many UICC applications as possible.

5. The method according to claim 4, wherein in said specific command is indicated that the PDP context for the preferred APN should be kept activated as much as possible.

6. The method according to claim 1, wherein in said specific command is indicated that the PDP context for the preferred APN should be kept activated as much as possible.

7. The method according to claim 1, wherein the UICC sets a PDP context status parameter in the PDP context parameters to activate the PDP context as an Always On or permanent PDP context.

8. The method according to claim 7, wherein the permanent PDP context indicates that the Mobile Equipment is kept activated as much as possible.

9. The method according to claim 1, wherein an event notification command is transmitted between the Mobile Equipment and the UICC.

10. The method according to claim 9, wherein, in the event notification command, one of an Always On and permanent PDP context for UICC is indicated.

11. A method for allowing a Universal Integrated Circuit Card (UICC) to set up data bearer parameters for a wireless communication between a User Equipment (TIE) and a remote server in a telecommunication network, said UE comprising said UICC and a Mobile Equipment each comprising a TCP/IP stack, said UICC embodying at least a first application that connects to at least a second application on a network side, said method comprising:
the UICC sending to the Mobile Equipment Packet Data Protocol (PDP) context parameters within a specific command defined for activating or deactivating a PDP context;
on a reception of said specific command, the Mobile Equipment transmitting a PDP context activation or deactivation request to the Network with the parameters received in said specific command;
on a reception of said PDP context request, the Network transmitting to the Mobile Equipment a confirmation for a PDP context activation or for a PDP context deactivation; and
the Mobile Equipment forwarding said confirmation to the UICC,
wherein, in a case a PDP context is already activated for a Mobile Equipment Application prior to said specific command from the UICC, and in a case current parameters of the already activated PDP context fit UICC needs, said Mobile Equipment notifies said UICC about the parameters of the already activated PDP context in order to avoid redundant operations of the UICC.

12. A method for allowing a Universal Integrated Circuit Card (UICC) to set up data bearer parameters for a wireless communication between a User Equipment (UE) and a remote server in a telecommunication network, said TIE comprising said UICC and a Mobile Equipment each comprising a TCP/IP stack, said UICC embodying at least a first application that connects to at least a second application on a network side, said method comprising:
the UICC sending to the Mobile Equipment Packet Data Protocol (PDP) context parameters within a specific command defined for activating or deactivating a PDP context;
on a reception of said specific command, the Mobile Equipment transmitting a PDP context activation or deactivation request to the Network with the parameters received in said specific command;
on a reception of said PDP context request, the Network transmitting to the Mobile Equipment a confirmation for a PDP context activation or for a PDP context deactivation;
the Mobile Equipment forwarding said confirmation to the UICC;
defining a preferred APN (Access Point Name) usable by as many UICC applications as possible; and
indicating in said specific command that the PDP context for the preferred APN and for any other APN should be kept activated as much as possible.

* * * * *